(12) United States Patent
Dietl et al.

(10) Patent No.: US 12,077,708 B2
(45) Date of Patent: Sep. 3, 2024

(54) HEAT TRANSFER LIQUID FOR COOLING LITHIUM STORAGE BATTERIES

(71) Applicant: BASF SE, Ludwigshafen am Rhein (DE)

(72) Inventors: Harald Dietl, Ludwigshafen (DE); Roger Sieg, Ludwigshafen (DE)

(73) Assignee: BASF SE

(*) Notice: Subject to any disclaimer, the term of this patent is extended or adjusted under 35 U.S.C. 154(b) by 804 days.

(21) Appl. No.: 17/288,255

(22) PCT Filed: Oct. 25, 2019

(86) PCT No.: PCT/EP2019/079237
§ 371 (c)(1),
(2) Date: Apr. 23, 2021

(87) PCT Pub. No.: WO2020/094428
PCT Pub. Date: May 14, 2020

(65) Prior Publication Data
US 2021/0380862 A1 Dec. 9, 2021

(30) Foreign Application Priority Data

Nov. 6, 2018 (EP) .................... 18204600
Feb. 12, 2019 (EP) .................... 19156712
Feb. 12, 2019 (EP) .................... 19156713

(51) Int. Cl.
| | |
|---|---|
| *C09K 5/10* | (2006.01) |
| *C09K 5/20* | (2006.01) |
| *H01M 8/04029* | (2016.01) |
| *H01M 10/0525* | (2010.01) |
| *H01M 10/0568* | (2010.01) |
| *H01M 10/0569* | (2010.01) |
| *H01M 10/613* | (2014.01) |
| *H01M 10/6567* | (2014.01) |

(52) U.S. Cl.
CPC .................. *C09K 5/10* (2013.01); *C09K 5/20* (2013.01); *H01M 8/04029* (2013.01); *H01M 10/613* (2015.04); *H01M 10/6567* (2015.04); *H01M 10/0525* (2013.01); *H01M 10/0568* (2013.01); *H01M 10/0569* (2013.01); *H01M 2300/0028* (2013.01)

(58) Field of Classification Search
CPC ................................ H01M 10/6567
See application file for complete search history.

(56) References Cited

U.S. PATENT DOCUMENTS

| | | |
|---|---|---|
| 3,849,433 A | 11/1974 | Butula |
| 8,394,287 B2 | 3/2013 | Evans et al. |
| 2017/0288268 A1 | 10/2017 | Kim et al. |
| 2019/0305374 A1 | 10/2019 | Tsay et al. |
| 2021/0403782 A1 | 12/2021 | Dietl et al. |
| 2022/0127510 A1 | 4/2022 | Dietl et al. |

FOREIGN PATENT DOCUMENTS

| | | |
|---|---|---|
| DE | 1948794 A1 | 4/1971 |
| WO | WO-95/07323 A1 | 3/1995 |
| WO | WO-03/074626 A1 | 9/2003 |
| WO | WO-2016/149442 A1 | 9/2016 |
| WO | WO-2018/095759 A1 | 5/2018 |
| WO | WO-2020/094427 A1 | 5/2020 |

OTHER PUBLICATIONS

Brinck et al. English machine translation of WO 03/074626. (Year: 2003).*
European Search Report for EP Patent Application No. 18204600.3, Issued on Apr. 16, 2019, 3 pages.
International Search Report received for PCT Application No. PCT/EP2019/079237, issued on Jan. 15, 2020, including English translation, 7 pages.
"Lithium-ion battery", Wikipedia, retrieved on Jan. 13, 2020, 43 pages. URL: https://en.wikipedia.org/w/index.php?title=Lithium-ion_battery&oldid=866702078.
Plakhotnyk, et al., "Hydrolysis in the system LiPF6-propylene carbonate-dimethyl carbonate-H2O", Journal of Fluorine Chemistry, vol. 126, Issue 1, Jan. 2005, pp. 27-31.
Written Opinion received for PCT Application No. PCT/EP2019/079237, issued on Jan. 15, 2020, including English translation, 8 pages.
Younesi, et al . . . , "Lithium salts for advanced lithium batteries: Li-metal, Li—O2, and Li—S", Energy and Environmental Science, vol. 8, Issue 7, Jun. 1, 2015, pp. 1905-1922.

* cited by examiner

*Primary Examiner* — Peter F Godenschwager
(74) *Attorney, Agent, or Firm* — Grüneberg and Myers, PLLC

(57) ABSTRACT

Substantially water-free antifreezes and coolants are useful for cooling lithium rechargeable batteries.

20 Claims, No Drawings

HEAT TRANSFER LIQUID FOR COOLING LITHIUM STORAGE BATTERIES

CROSS-REFERENCE TO RELATED APPLICATIONS

This application is the National Stage entry under § 371 of International Application No. PCT/EP2019/079237, filed on Oct. 25, 2019; and which claims the benefit of European Application No. 18204600.3, filed on Nov. 6, 2018; European Application No. 19156713.0, filed on Feb. 12, 2019; and European Application No. 19156712.2, filed on Feb. 12, 2019. The content of each of these applications is hereby incorporated by reference in its entirety.

The present invention relates to novel, substantially water-free antifreezes and coolants for cooling lithium rechargeable batteries, preferably in motor vehicles, particularly preferably in passenger and utility vehicles (so-called light and heavy duty vehicles).

Lithium rechargeable batteries for mobile use, particularly in motor vehicles, must be operable even at low external temperatures of down to about minus 40° C. A frost-protected coolant circuit is therefore indispensable.

Furthermore, temperatures of up to above 100° C. are reached during rapid charging of batteries and so the heat must be removed in order not to damage the particular component.

For lithium rechargeable batteries both particularly low temperatures and particularly high temperatures are generally disadvantageous:

At high temperatures of about 180° C. certain rechargeable batteries, for example those comprising cobalt oxides, lithium cobalt(III) oxide, nickel dioxide or mixed oxides, such as lithium nickel manganese cobalt oxides, exhibit thermal runaway behavior where the employed oxides decompose and liberate oxygen which can lead to exothermic reactions within the cell, for example reaction with hydrogen which can result in fires or destruction of the cell.

The electrolyte material further has a tendency to decompose at high temperatures.

Manufactures therefore often recommend limiting the operating temperature of lithium rechargeable batteries to +60° C. during discharging.

Conversely, the operational capability of the rechargeable batteries is limited by various effects at low temperatures, for example freezing or precipitation of the electrolyte, increased viscosity of the electrolyte material, reduced ion migration or elevated internal resistance of the cell.

Manufacturers therefore often recommend a temperature range of about 0° C. to +40° C., optimally 18° C. to 25° C., for the use of the rechargeable batteries during discharging.

Charging at particularly low temperatures can also result in severe aging and irreversible damage to the electrode material, and so 0° C. is typically recommended as the lower temperature limit for charging.

One purpose of a coolant is thus that of keeping the rechargeable batteries in a temperature range in which they are optimally functional and there is no risk of damage both during charging and during discharging.

This allows more efficient temperature management of the thus-cooled rechargeable batteries.

The use of conventional aqueous antifreezes employed in internal combustion engines and based on water and monoalkylene glycols optionally in conjunction with glycerol would not be possible in rechargeable batteries, fuel cells and/or batteries without complete electrical insulation of the coolant channels, since these antifreezes have an excessive electrical conductivity which would adversely affect the function of the fuel cell or battery on account of the salts and ionizable compounds present therein as corrosion inhibitors. Furthermore, for example in the event of an accident with leakage of the electrolyte liquid there is a risk of short circuit due to contact of the battery terminals with the cooling liquid and/or evolution of hydrogen gas by electrolysis which carries additional risk potential.

However the salts used as electrolytes react with water by undergoing hydrolysis. For instance it is known for example from A. V. Plakhotnyk et al., Journal of Fluorine Chemistry, 126 (2005) 27-31 that in the case of $LiPF_6$ dissolved in aprotic organic solvents even at a water content of 0.5 wt % a total of about 10 mol % of the employed $LiPF_6$ is hydrolyzed over about 23 days. Accordingly, the hydrolysis of the electrolyte $LiPF_6$ alters the composition of the electrolyte and thus results in an undefined alteration to the functionality of the rechargeable battery. The hydrolysis further results in formation of toxic hydrofluoric acid.

There is therefore a need for coolants which undergo no significant reaction upon contact with the electrolyte liquid.

WO 95/07323 discloses water-free coolants having a water content below 0.5 wt % based on propylene glycol and optionally ethylene glycol, but only for internal combustion engines. Usage for cooling of electrical components is not proposed.

It is also necessary for the coolants to maintain their initially usually low electrical conductivity over a long period of time and not increase in conductivity due to various decomposition processes, usually to form ions.

Water-free coolant concentrates, in which an antifreeze component, usually monoethylene glycol, is mixed with various additives, for example corrosion inhibitors, antioxidants, antifoams, bitterants and dyes, are widely described in the prior art, for example in U.S. Pat. No. 8,394,287. U.S. Pat. No. 8,394,287 additionally describes the presence of at least one further antifreeze component, for example monopropylene glycol, higher ethylene glycol homologs or glycerol, in the concentrate.

The purpose of these coolant concentrates is always later dilution with water for use as coolant (usually with a water content of 30 to 70 vol %); the use of the undiluted concentrates as coolant is not intended.

Often also described are so-called superconcentrates which are essentially highly concentrated formulations of the above additives in relatively little antifreeze component, usually monoethylene glycol or else monopropylene glycol.

The purpose of these superconcentrates is always later dilution with an antifreeze component to produce the coolant concentrate and, subsequently, production of the actual coolant therefrom. The use of the undiluted superconcentrates as coolant is not intended.

The use as coolant for rechargeable batteries is neither described nor suggested in the above documents.

It was accordingly the object of the present invention to develop coolants which allow at-cell cooling of lithium rechargeable batteries without the coolant undergoing significant reaction with the employed electrolyte liquid upon contact therewith, which have a low electrical conductivity, which remain employable at low temperature, i.e. do not solidify or exhibit a severe viscosity increase, and which are capable of removing heat even at high temperatures.

Further, the coolant should furthermore exhibit a low conductivity and also retain this in operation, thus especially necessitating low corrosion since corrosion entails introduction of ions into the coolant which would increase electrical conductivity The object was achieved by the use of heat-transfer liquids comprising (A) at least one alkylene glycol derivative of formula (I)

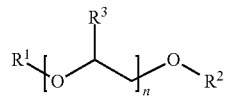

where
R¹ is hydrogen or $C_1$- to $C_4$-alkyl, preferably hydrogen, methyl or ethyl, particularly preferably hydrogen or methyl and very particularly preferably hydrogen,
R² is $C_1$- to $C_4$-alkyl, preferably methyl, ethyl or n-butyl, particularly preferably methyl or n-butyl and very particularly preferably methyl,
R³ is hydrogen or methyl, preferably hydrogen, and
n is on arithmetic average a number from 3.0 to 4.0, and (B) at least one corrosion inhibitor selected from the group consisting of
(Ba) orthosilicate esters and/or alkoxyalkylsilanes
(Bb) azole derivatives
(Bc) compounds of general formula (II)

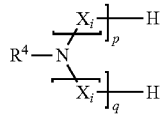

where
R⁴ is an organic radical having 6 to 10 carbon atoms, in particular a straight-chain or branched, preferably straight-chain, alkyl or alkenyl radical having 6 to 10 carbon atoms, preferably 7 to 9 and particularly preferably 8 carbon atoms, p and q are independently of one another a positive integer from 1 to 30, preferably 1 to 20, particularly preferably 1 to 10, very particularly preferably 1 to 5 and in particular 1 to 3, especially 1 or 2, and
each $X_i$ for i=1 to p and 1 to q are independently of one another selected from the group consisting of —$CH_2$— $CH_2$—O—, —$CH_2$—$CH(CH_3)$—O—, —$CH(CH_3)$— $CH_2$—O—, —$CH_2$—$C(CH_3)_2$—O—, —$C(CH_3)_2$— $CH_2$—O—, —$CH_2$—$CH(C_2H_5)$—O—, —$CH$ $(C_2H_5)$—$CH_2$—O—, —$CH(CH_3)$—$CH(CH_3)$—O—, —$CH_2$—$CH_2$—$CH_2$—O— and —$CH_2$—$CH_2$— $CH_2$—$CH_2$—O—, preferably selected from the group consisting of —$CH_2$—$CH_2$—O—, —$CH_2$—CH $(CH_3)$—O— and —$CH(CH_3)$—$CH_2$—O—, particularly preferably are —$CH_2$—$CH_2$—O—,
for cooling lithium-ion rechargeable batteries comprising as electrolyte (E) at least one compound selected from the group consisting of lithium hexafluorophosphate ($LiPF_6$), lithium tetrafluoroborate ($LiBF_4$), lithium perchlorate ($LiClO_4$), lithium phosphate ($Li_3PO_4$) and lithium bis(oxalato) borate (LiBOB),
with the proviso that the heat-transfer liquid
comprises less than 1 wt % of water, preferably less than 0.75, particularly preferably less than 0.5, very particularly preferably less than 0.4, in particular less than 0.3 and especially less than 0.2 wt %.

It is an advantage of the compositions according to the invention that the employed components (A) do not undergo significant reaction with the electrolytes (E) employed in the lithium-ion rechargeable batteries should these come into contact with one another due to mechanical damage to the cell for example.

The individual components are more particularly described hereinbelow:
Component (A)
In the at least one alkylene glycol derivative of formula (I)

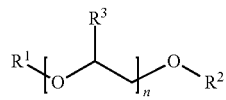

R¹ is hydrogen or $C_1$- to $C_4$-alkyl, preferably hydrogen, methyl or ethyl, particularly preferably hydrogen or methyl and very particularly preferably hydrogen,
R² is $C_1$- to $C_4$-alkyl, preferably methyl, ethyl or n-butyl, particularly preferably methyl or n-butyl and very particularly preferably methyl,
R³ is hydrogen or methyl, preferably hydrogen, and
n is on arithmetic average a number from 3.0 to 4.0.
Preferred alkylene glycol derivatives (A) are
Triethylene glycol monomethyl ether
Triethylene glycol monoethyl ether
Triethylene glycol mono-n-butyl ether
Triethylene glycol dimethyl ether
Triethylene glycol diethyl ether
Triethylene glycol di-n-butyl ether
Tetraethylene glycol monomethyl ether
Tetraethylene glycol monoethyl ether
Tetraethylene glycol mono-n-butyl ether
Tetraethylene glycol dimethyl ether
Tetraethylene glycol diethyl ether
Tetraethylene glycol di-n-butyl ether
Tripropylene glycol monomethyl ether
Tripropylene glycol monoethyl ether
Tripropylene glycol mono-n-butyl ether
Tripropylene glycol dimethyl ether
Tripropylene glycol diethyl ether
Tripropylene glycol di-n-butyl ether
Tetrapropylene glycol monomethyl ether
Tetrapropylene glycol monoethyl ether
Tetrapropylene glycol mono-n-butyl ether
Tetrapropylene glycol dimethyl ether
Tetrapropylene glycol diethyl ether
Tetrapropylene glycol di-n-butyl ether
The ethylene glycol ethers are preferred over the propylene glycol ethers.
Furthermore, the monoalkyl ethers are preferred over the dialkyl ethers.
It is preferable when component (A) is a substantially pure compound of formula (I) where n=3 or a mixture of compounds of formula (I) where n=3 and n=4. For the compounds of formula (I) in the mixture n is on arithmetic average preferably from 3.0 to 3.6, particularly preferably from 3.0 to 3.5, very particularly preferably from 3.05 to 3.4, in particular from 3.1 to 3.3 and especially from 3.15 to 3.25.
For the compounds in the mixture the radicals R¹ and R² may be identical or different, preferably they are identical.
"Substantially pure" is to be understood as meaning that for compounds of formula (I) where n=3 or n=4 homologous compounds having higher and lower values for n are likewise present to a certain extent.
The purity of compounds of formula (I) where n=3 is generally at least 80 wt %, preferably at least 85 wt %, very particularly preferably at least 90 wt %, in particular at least 95 wt % and especially at least 97.5 wt %. The remainder is predominantly made up of compounds of formula (I) where n=2 and n=4.

By contrast, in the case of compounds of formula (I) where n=4 the purity is usually only above 50 wt %, preferably at least 55, particularly preferably at least 60 wt %. The remainder is predominantly made up of compounds of formula (I) where n=3 and, to a lesser extent, n=5.

Preferred components (A) comprising substantially pure compounds are
Triethylene glycol monomethyl ether
Triethylene glycol monoethyl ether
Triethylene glycol mono-n-butyl ether Preferred components (A) comprising mixtures of compounds of formula (I) where n=3 and n=4 are
Triethylene glycol monomethyl ether in admixture with tetraethylene glycol monomethyl ether
Triethylene glycol monoethyl ether in admixture with tetraethylene glycol monoethyl ether
Triethylene glycol mono-n-butyl ether in admixture with tetraethylene glycol mono-n-butyl ether Conceivable, albeit less preferred, are those mixtures of compounds of
formula (I) where n=3 and n=4 having different radicals $R^1$.
Such mixtures are
Triethylene glycol monomethyl ether in admixture with tetraethylene glycol monoethyl ether
Triethylene glycol monomethyl ether in admixture with tetraethylene glycol mono-n-butyl ether
Triethylene glycol monoethyl ether in admixture with tetraethylene glycol monomethyl ether
Triethylene glycol monoethyl ether in admixture with tetraethylene glycol mono-n-butyl ether
Triethylene glycol mono-n-butyl ether in admixture with tetraethylene glycol monomethyl ether
Triethylene glycol mono-n-butyl ether in admixture with tetraethylene glycol monoethyl ether Conceivable, albeit less preferred, are mixed alkylene glycol derivatives of formula (I) where for each n $R^3$ may independently of one another be identical or different, i.e. tri- and tetraalkylene glycol derivatives of formula (I) from mixtures of ethylene oxide and propylene oxide.

In the case of mixtures of compounds of formula (I) where n=3 and n=4 the ratio is preferably from 100:0 to 40:60, particularly preferably 95:5 to 50:50, very particularly preferably 90:10 to 60:40, in particular from 85:15 to 70:30 and especially 85:15 to 75:25.

Component (B)

Component (B) is at least one corrosion inhibitor selected from the group consisting of
(Ba) orthosilicate esters and/or alkoxyalkylsilanes
(Bb) azole derivatives and
(Bc) compounds of general formula (II)

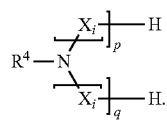

The orthosilicate esters (Ba) are compounds of formula $Si(OR^5)_4$ where
$R^5$ is in each case an organic radical having 1 to 6 carbon atoms, preferably a straight-chain or branched, preferably straight-chain, alkyl radical having 1 to 6 carbon atoms or an aryl radical having 6 carbon atoms, particularly preferably an alkyl radical having 1 to 4 carbon atoms, very particularly preferably an alkyl radical having 1 or 2 carbon atoms.

Examples thereof include
Tetramethyl orthosilicate
Tetraethyl orthosilicate
Tetra-n-butyl orthosilicate
Tetraphenyl orthosilicate Preference is given to
Tetramethyl orthosilicate
Tetraethyl orthosilicate Particular preference is given to
Tetraethyl orthosilicate.

The alkoxyalkylsilanes less preferred than the orthosilicate esters are preferably triethoxymethylsilane, diethoxydimethylsilane, ethoxytrimethylsilane, trimethoxymethylsilane, dimethoxydimethylsilane and methoxytrimethylsilane.

In the context of the present specification azole derivatives (Bb) are to be understood as meaning five-membered heterocyclic compounds having 2 or 3 heteroatoms from the group of nitrogen and sulfur which comprise no sulfur atoms or at most one sulfur atom incorporated in the ring and which may optionally bear an aromatic or saturated six-membered annelation.

These five-membered heterocyclic compounds (azole derivatives) typically comprise as heteroatoms two N atoms and no S atom, 3 N atoms and no S atom or one N atom and one S atom.

Preferred groups of the recited azole derivatives are annelated imidazoles and annelated 1,2,3-triazoles of general formula

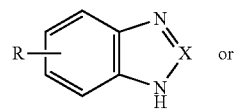

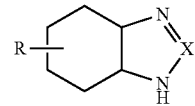

in which the variable
R is hydrogen or a $C_1$- to $C_{10}$-alkyl radical, in particular methyl or ethyl, and
the variable X is a nitrogen atom or the C—H moiety.

Typical and preferred examples of azole derivatives of general formula (III) are benzimidazole (X=C—H, R=H), benzotriazole (X=N, R=H) and tolyltriazole (X=N, R=CH$_3$). A typical example of an azole derivative of general formula (IV) is hydrogenated 1,2,3-tolyltriazole (X=N, R=CH$_3$).

A further preferred group of the recited azole derivatives are benzothiazoles of general formula (V)

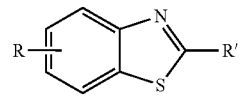

in which
the variable R is as defined above and
the variable R' is hydrogen, a $C_1$- to $C_{10}$-alkyl radical, in particular methyl or ethyl, or in particular a mercapto group (—SH). Conceivably, albeit less preferably, R' may also be a carboxyalkyl radical of formula —$(C_mH_{2m})$—COOR", wherein m is a number from 1 to 4 and R" is $C_1$- to $C_{10}$-alkyl, in particular methyl or ethyl, or $C_6$- to $C_{12}$-aryl. Examples thereof include 2-benzothiazylthio acetate or 3-(2-benzothiazylthio) propionate. A typical example of an azole derivative of general formula (V) is 2-mercaptobenzthiazole.

Also preferred are non-annelated azole derivatives of general formula (VI)

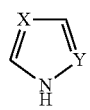

(VI)

in which the variables
X and Y are together two nitrogen atoms or
a nitrogen atom and a C—H moiety,
for example 1H-1,2,4-triazole (X=Y=N) or preferably imidazole (X=N, Y=C—H).

Very particularly preferred as azole derivatives for the present invention are benzimidazole, benzotriazole, tolyltriazole, hydrogenated tolyltriazole or mixtures thereof, in particular benzotriazole or tolyltriazole, especially tolyltriazole.

The recited azole derivatives are commercially available or are producible by common methods. Hydrogenated benzotriazoles such as hydrogenated tolyltriazole are likewise obtainable according to DE-A 1 948 794 and also commercially available.

In general formula (II) of component (Bc)
$R^4$ is an organic radical having 6 to 10 carbon atoms, in particular a straight-chain or branched, preferably straight-chain, alkyl or alkenyl radical having 6 to 10 carbon atoms, preferably 7 to 9 and particularly preferably 8 carbon atoms, p and q are independently of one another a positive integer from 1 to 30, preferably 1 to 20, particularly preferably 1 to 10, very particularly preferably 1 to 5, in particular 1 to 3, especially 1 or 2, and
each $X_i$ for i=1 to p and 1 to q are independently of one another selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2$—O—, preferably selected from the group consisting of —$CH_2$—$CH_2$—O—, —$CH_2$—$CH(CH_3)$—O— and —$CH(CH_3)$—$CH_2$—O—, particularly preferably are —$CH_2$—$CH_2$—O—.

In the compounds of formula (II) the structural element $R^4$—N< is preferably derived from fatty amines which are preferably obtainable by hydrogenation and amination of fatty acids and esters, particularly preferably by hydrogenation and amination of the abovementioned fatty acids or amination of fatty alcohols.

Alkyl radicals are preferred over alkenyl radicals as radicals $R^4$.

In one specific embodiment p and q are independently of one another 1, 2 or 3, particularly preferably 1 or 2 and very particularly preferably 1.

In a preferred embodiment the fatty amines are n-hexylamine, 2-methylpentylamine, n-heptylamine, 2-heptylamine, iso-heptylamine, 1-methylhexylamine, n-octylamine, 2-ethylhexylamine, 2-aminooctane, 6-methyl-2-heptylamine, n-nonylamine, iso-nonylamine, n-decylamine and 2-propylheptylamine or mixtures thereof.

n-Hexylamine, n-octylamine, 2-ethylhexylamine and n-decylamine are particularly preferred and n-octylamine and 2-ethylhexylamine, and in particular n-octylamine, are very particularly preferred.

Especially worthy of mention are of di-, tri-, tetra-, penta- and hexa-ethoxylated n-octylamine and mixtures thereof, and di-, tri-, tetra-, penta- and hexa-ethoxylated n-hexylamine and mixtures thereof.

In the alkoxylated amines of general formula (II) the degree of alkoxylation relates to the sum of (p+q), i.e. to the average total number of alkoxylation units per molecule of amine.

The compounds (II) are preferably obtainable by reacting the corresponding amines $R^4$—$NH_2$ with alkylene oxides up to the desired average statistical degree of alkoxylation, preferably under basic conditions. This is particularly preferred when the structural unit $X_i$ is derived from ethylene oxide or propylene oxide, preferably from ethylene oxide.

The compositions according to the invention generally comprise
Component (A): 95 to 99.9 wt %, preferably 96 to 99.8, particularly preferably 97 to 99.5, very particularly preferably 97.5 to 99 wt % and in particular 98 to 99 wt %.
Component (B): 0.1 to 5 wt %, preferably 0.2 to 4, particularly preferably 0.5 to 3, very particularly preferably 1 to 2.5 wt % and especially 1 to 2 wt %.
Component (C)—Further Optional Corrosion Inhibitors In addition to at least one of the above components (B) as an obligatory corrosion inhibitor the composition according to the invention may optionally also comprise at least one further corrosion inhibitor distinct from those specified under (B).

However, in a preferred embodiment of the present invention the composition comprises no further corrosion inhibitors (C) in addition to the abovementioned components (B).

Examples of components (C) are aliphatic, cycloaliphatic or aromatic amines having 2 to 15 carbon atoms which may additionally comprise ether oxygen atoms or hydroxyl groups and which are distinct from the compounds (Bc) of formula (II).

The amines (C) preferably comprise 2 to 9, in particular 4 to 8, carbon atoms. The amines (C) are preferably tertiary amines. The amines (C) preferably comprise 0 to 3 ether oxygen atoms or 0 to 3, preferably 0 to 2, hydroxyl groups. Typical examples of the amines (C) are ethylamine, propylamine, iso-propylamine, n-butylamine, iso-butylamine, sec-butylamine, tert-butylamine, n-pentylamine, n-hexylamine, n-heptylamine, n-octylamine, 2-ethylhexylamine, n-nonylamine, iso-nonylamine, di-n-propylamine, diisopropylamine, di-n-butylamine, mono-, di- and triethanolamine, mono-, di- and triisopropanolamine, piperidine, morpholine, cyclohexylamine, aniline and benzylamine. Aliphatic and cycloaliphatic amines (C) are generally saturated.

Also conceivable is the use as a further corrosion inhibitor of fatty acid alkoxylates and fatty alcohol alkoxylates, such as are as described in WO 18/95759 as compounds of formula (V) and (VI) on page 5, line 34 to page 10, line 10 as hereby incorporated by reference.

Component (C) is optional and may be present in the compositions according to the invention in amounts of 0 to 2 wt %, preferably 0 to 1.5 wt %, particularly preferably 0 to 1 wt %, very particularly preferably 0 to 0.7 wt %.

In an expressly preferred embodiment no component (C) is present.

Component (D)—Further Additives

The composition according to the invention may optionally also comprise at least one further additive selected from the group consisting of
(Db) dyes
(Dc) defoamers
(Dd) antioxidants and
(De) emulsifiers.

These substances are commercially available and customary compounds from the prior art which may typically be employed in coolants.

One function of the employed emulsifiers (De) in the compositions according to the invention is that they can emulsify any contaminants and/or assembly fluids originating from the cooling system, for example polyalkylene glycols or oligomers of glycerol, in the compositions.

Components (D) are in each case optional and may each independently of one another be present in the compositions according to the invention in amounts of 0 to 0.5 wt %, preferably 0.001 to 0.3 wt % and particularly preferably 0.002 to 0.2 wt %.

Component (E)—Electrolyte Liquids

The purpose of the electrolyte is to ensure movement of the lithium cations between the cathode and the anode during charging or discharging for charge equalization, and so lithium salts (Ea) are suitable therefor.

The electrolytes employed in the lithium ion rechargeable batteries to be cooled according to the invention are selected from the group consisting of lithium hexafluorophosphate ($LiPF_6$), lithium tetrafluoroborate ($LiBF_4$), lithium perchlorate ($LiClO_4$), lithium phosphate ($Li_3PO_4$) and lithium bis(oxalato)borate (LiBOB), preferably selected from the group consisting of lithium hexafluorophosphate ($LiPF_6$), lithium tetrafluoroborate ($LiBF_4$) and lithium perchlorate ($LiClO_4$), particularly preferably selected from the group consisting of lithium hexafluorophosphate ($LiPF_6$) and lithium tetrafluoroborate ($LiBF_4$), and very particularly preferably are lithium hexafluorophosphate ($LiPF_6$).

These electrolyte salts are typically dissolved in aprotic organic solvents (Eb) to keep the electrolyte salt (Ea) liquid and thus to ensure the mobility of the lithium ions in the rechargeable battery.

The content of component (Ea) in the electrolyte liquid, i.e. the sum of (Ea) and (Eb), may be for example 5 to 50 wt %, preferably 10 to 40 and especially preferably 15 to 30 wt %.

Examples of aprotic solvents (Eb) are open-chain or cyclic carbonates, ethers, for example cyclic or open-chain ethers, such as alkylene glycol dialkyl ethers, or acetonitrile; open-chain or cyclic carbonates are preferred.

Open-chain carbonates are preferably dialkyl carbonates, preferably di-$C_1$-$C_4$-alkyl carbonates, particularly preferably dimethyl carbonate, ethyl methyl carbonate, diethyl carbonate or di-n-butyl carbonate.

Cyclic carbonates are preferably ethylene carbonate and propylene carbonate.

Cyclic ethers are for example tetrahydrofuran, alkylene glycol dialkyl ethers are preferably ethylene glycol dialkyl ethers, particularly preferably ethylene glycol di-$C_1$-$C_4$-alkyl ether, very particularly preferably ethylene glycol dimethyl ether, ethylene glycol diethyl ether and ethylene glycol di-n-butyl ether, in particular ethylene glycol dimethyl ether.

In one embodiment the carbonates of component (A) may be employed as solvent (Eb) for the electrolytes either alone or preferably in conjunction with the other abovementioned aprotic solvents. The use of these carbonates in the heat-transfer liquid is also conceivable.

These carbonates are aprotic compounds of formula (VII)

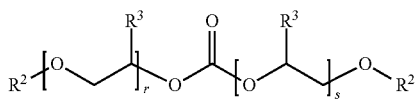

where
$R^2$ and $R^3$ are as defined above for component (A) and r and s are on arithmetic average numbers from 3.0 to 4.0, wherein $R^2$ and $R^3$ may independently of one another for each r and s be identical or different, preferably are identical.

The compounds of formula (VII) are for example
Carbonates of triethylene glycol monomethyl ether
Carbonates of triethylene glycol monoethyl ether
Carbonates of triethylene glycol mono-n-butyl ether
Carbonates of tetraethylene glycol monomethyl ether
Carbonates of tetraethylene glycol monoethyl ether
Carbonates of tetraethylene glycol mono-n-butyl ether
Mixed carbonates of triethylene glycol monomethyl ether and tetraethylene glycol monomethyl ether
Mixed carbonates of triethylene glycol monoethyl ether and tetraethylene glycol monoethyl ether
Mixed carbonates of triethylene glycol mono-n-butyl ether and tetraethylene glycol mono-n-butyl ether
Carbonates of tripropylene glycol monomethyl ether
Carbonates of tripropylene glycol monoethyl ether
Carbonates of tripropylene glycol mono-n-butyl ether
Carbonates of tetrapropylene glycol monomethyl ether
Carbonates of tetrapropylene glycol monoethyl ether
Carbonates of tetrapropylene glycol mono-n-butyl ether
Mixed carbonates of tripropylene glycol monomethyl ether and tetrapropylene glycol monomethyl ether
Mixed carbonates of tripropylene glycol monoethyl ether and tetrapropylene glycol monoethyl ether
Mixed carbonates of tripropylene glycol mono-n-butyl ether and tetrapropylene glycol mono-n-butyl ether.

Among these, the carbonates of the ethylene glycol ethers are preferred over those of the propylene glycol ethers.

The carbonates are generally in the form of mixtures of the respective homologs, the following mixtures being preferred:
mixture of carbonate of triethylene glycol monomethyl ether, carbonate of tetraethylene glycol monomethyl ether and mixed carbonate of triethylene glycol monomethyl ether and tetraethylene glycol monomethyl ether,
mixture of carbonate of triethylene glycol monoethyl ether, carbonate of tetraethylene glycol monoethyl ether and mixed carbonate of triethylene glycol monoethyl ether and tetraethylene glycol monoethyl ether, and
mixture of carbonate of triethylene glycol mono-n-butyl ether, carbonate of tetraethylene glycol mono-n-butyl ether and mixed carbonate of triethylene glycol mono-n-butyl ether and tetraethylene glycol mono-n-butyl ether.

In a preferred embodiment the radicals $R^2$ and $R^3$ in the employed component (A) and the carbonate (Eb) are identical.

Properties of the Compositions According to the Invention

The compositions according to the invention are subject to the following provisos:

They comprise less than 1 wt % of water, preferably less than 0.75, particularly preferably less than 0.5, very particularly preferably less than 0.4, in particular less than 0.3 and especially less than 0.2 wt %. It may be advantageous to establish a water content below 0.15 wt %, preferably below 0.1 wt % and even below 0.05 wt %.

The low water content according to the invention ensures that only a low level of hydrolysis of the employed electrolyte (Ea) results, even in the long term, should the heat-transfer liquid and the electrolyte salt (Ea) come into contact.

When using the composition as coolant for cooling systems in fuel cells, rechargeable batteries and/or batteries, water, having significant electrical conductivity, can moreover result in electrolysis of the composition and undesired hydrogen evolution which entails an elevated risk of accidents.

It may further be advantageous when the compositions according to the invention comprise a proportion of alkylene glycol derivatives of formula (I) where n≤2 of not more than 10 wt %, preferably not more than 8, particularly preferably not more than 6, very particularly preferably not more than 5, in particular not more than 4 and especially not more than 3 wt %.

A higher content of alkylene glycol derivatives of formula (I) where n≤2 would likewise result in an unwanted lowering of the boiling point and would also result in excessive reduction of the viscosity of the composition. An excessively low viscosity may be undesired in certain applications since low-viscosity liquids easily defeat seals and thus cause leaks.

It may further be advantageous when the compositions according to the invention comprise a proportion of alkylene glycol derivatives of formula (I) where n≥5 of not more than 5 wt %, preferably not more than 4, particularly preferably not more than 3, very particularly preferably not more than 2.5 and especially not more than 2 wt %.

It is conversely true that higher homologs bring about a high viscosity of the composition and thus impede the pumpability of the composition. A high viscosity entails elevated pump power output and thus elevated energy consumption of the pumps. Furthermore, the higher homologs additionally have an elevated melting point, so that at low temperatures there is a risk that they may precipitate out of the composition.

It may further be advantageous when the compositions according to the invention comprise a proportion of mono-ethylene glycol, diethylene glycol, monopropylene glycol, dipropylene glycol, 1,3-propylene glycol and glycerol of in each case not more than 20 wt %, preferably not more than 15, particularly preferably not more than 10, very particularly preferably not more than 8 and especially not more than 5 wt %.

The compositions according to the invention preferably have a specific heat capacity at 50° C. of at least 2.0 kJ/kg×K, particularly preferably of at least 2.1, very particularly preferably at least 2.2 and in particular of at least 2.3 kJ/kg×K.

The compositions according to the invention preferably have a thermal conductivity of at least 0.15 W/m×K.

Also preferably employed as components (A) are compounds having a polarizability of not more than 50 C×m²/V, particularly preferably not more than 45, very particularly preferably not more than 40, in particular not more than 35 and especially not more than 30.

Use

It is an advantage of the described compositions that they may be used as heat-transfer liquids for cooling, preferably for at-cell cooling, of lithium-ion rechargeable batteries. This allows thermostatting of rechargeable batteries in an optimal temperature range both against low temperatures and against high temperatures and removal of limitations on their operation.

The coolants according to the invention are particularly suitable for at-cell cooling of lithium-ion rechargeable batteries, wherein in the context of the present specification this is to be understood as meaning that a rechargeable battery cell is in heat-conducting contact with the heat exchanger containing the coolant via a portion of the wall of the cell. It is even conceivable for the wall of the cell to be immediately surrounded by coolant flow and thus be in direct contact with the coolant.

Although the present specification predominantly uses the traditional term "coolant" this is to be understood as referring not only to removal of heat but also to supply of heat at low temperatures of the rechargeable batteries. In the context of the present specification and to the extent relevant to the present invention "coolant" is to be understood as being synonymous with "heat-transfer liquid" and "cooling" as being synonymous with "temperature control".

The heat-transfer liquids according to the invention are especially suitable for temperature-control of those lithium-ion rechargeable batteries not employing metallic lithium, particularly preferably lithium cobalt dioxide rechargeable batteries, lithium titanate rechargeable batteries, lithium manganese rechargeable batteries, lithium nickel cobalt aluminum rechargeable batteries and lithium iron phosphate rechargeable batteries, each of which may also be configured as lithium polymer rechargeable batteries. Particular preference is given to the use in lithium cobalt dioxide rechargeable batteries, lithium manganese rechargeable batteries and lithium nickel cobalt aluminum rechargeable batteries, very particularly preferably in lithium manganese rechargeable batteries and lithium nickel cobalt aluminum rechargeable batteries.

In accordance with general usage the terms "battery" and "rechargeable battery" are used here in such a way that rechargeable batteries are to be understood as rechargeable individual or interconnected storage means for chemical energy and "battery" is used as an umbrella term for rechargeable and nonrechargeable storage means. The term "rechargeable battery" is thus a subset of "battery".

It is a further advantage of the compositions according to the invention that they are compatible with the most important typically employed sealing materials. This applies for example to EPDM (ethylene-propylene-diene (monomer) rubbers, preferably according to EN 13956), SBR (styrene-butadiene rubbers), FKM (fluorocarbon rubbers, preferably according to DIN ISO 1629 or ASTM D 1418, for example Viton®), NBR (acrylonitrile butadiene rubbers) and HNBR (hydrogenated acrylonitrile butadiene rubbers).

It is a further advantage of the compositions according to the invention that they are compatible with the most important typically employed wall materials for battery cells. This applies, for example, to polyethylene (PE), polypropylene (PP), polystyrene (PS), acrylonitrilebutadiene-styrene copolymers (ABS), polycarbonates (PC) and polymethyl methacrylate (PMMA).

It is an advantage of the compositions according to the invention that they are stable to thermal stress and oxidation and their initially low electrical conductivity is retained even in the longer term since the formation of electrically conductive products as a result of decomposition or oxidation is reduced.

The compositions according to the invention preferably have a boiling point at 1013 hPa (standard pressure) of at least 200° C., preferably at least 210° C., particularly preferably at least 220° C., very particularly preferably at least 230° C. and in particular at least 250° C.

This ensures that the compositions remain liquid even at high ambient temperatures and can function as heat-transfer media without the vapor pressure over the compositions increasing excessively. The compositions according to the invention may therefore be employed in open systems even at high temperatures.

As specified hereinabove the compositions according to the invention have an advantageous viscosity which is not too low and not too high.

They preferably have a kinematic viscosity at 100° C. according to ASTM D445 of at most 4 mm$^2$/s, particularly preferably of at most 3 and very particularly preferably of at most 2 mm$^2$/s.

They moreover preferably exhibit a kinematic viscosity at minus 40° C. according to ASTM D445 of not more than 600 mm$^2$/s, particularly preferably of not more than 500, very particularly preferably of not more than 400 and in particular of not more than 350 mm$^2$/s.

It is an advantage of the compositions according to the invention that over a wide temperature range, preferably from minus 40° C. to plus 100° C., they exhibit not only a lower viscosity but also a smaller change in viscosity than conventional coolants based on water and monoethylene glycol:

For instance a mixture of 50 wt % water and 50 wt % monoethylene glycol already solidifies at about minus 37° C. and is thus not employable in the abovementioned preferred temperature range. The kinematic viscosity of such a mixture is about 300 mm$^2$/s at minus 20° C.

It is an advantage of the present invention that typical mixtures according to the present invention are not solid at minus 40° C. and have a kinematic viscosity at minus 40° C. of about 250 to 500 mm$^2$/s and at minus 20° C. of not more than about 100 mm$^2$/s.

Accordingly, for the compositions according to the invention the change in kinematic viscosity in the temperature range from minus 40° C. to plus 100° C. is not more than about 500 mm$^2$/s and thus varies to a lesser extent than the abovementioned mixture of water and monoethylene glycol. This has the result that the cooling system may employ pumps having a lower conveying power output, so that less energy is required for conveying the coolant in the cooling system.

Amounts reported in percent, ppm or parts in this specification relate to wt %, ppmw or parts by weight unless otherwise stated.

EXAMPLES

To determine the reactivity of the components (A) with the electrolyte (E) online and in noninvasive fashion, 500 MHz $^1$H-, 470 MHz $^{19}$F- and 202 MHz $^{31}$P-NMR spectra of the components individually and/or in admixture were determined in a Bruker AV3-500p NMR spectrometer at 298 K against an external DMSO standard.

The electrolyte liquid employed was Selectylite® LP 57 which, according to WO 2016/149442 A1, is a 1 M solution of LiPF$_6$ in 30:70 (w/w) ethylene carbonate:ethyl methyl carbonate.

The component (A) employed was the following additized mixture of triethylene glycol monomethyl ether and tetraethylene glycol monomethyl ether:

| | |
|---|---|
| Triethylene glycol monomethyl ether | 86.2 |
| Tetraethylene glycol monomethyl ether | 10 |
| Octyldiethanolamine | 1.8 |
| Additive mixture: | |
| Tolyltriazole* | 0.05 |
| Antioxidant** | 0.03 |
| Emulsifiers*** | 0.25 |
| Triethylene glycol monomethyl ether | 1.67 |
| Defoamer | 0.001 |
| Sum | 100 |

The components employed in the additive mixture have the following activity:
*Tolyltriazole as an inhibitor against non-ferrous metal corrosion
**Antioxidant for preventing/reducing oxidation of the alkylene glycol ethers
***Mixture of fatty alcohol ethoxylates Example 1—Spectra of the Electrolyte Liquid Alone The $^1$H-NMR showed only the signals of the solvent mixture.

The $^{31}$P-NMR showed a heptet at −144 ppm of LiPF$_6$ and weak signals at −19 and −34 ppm which indicate traces of difluorophosphoric acid and phosphoryl fluoride.

The $^{19}$F-NMR spectrum showed a doublet at −74 ppm and weak doublets at −85 and −90 ppm which indicate traces of difluorophosphoric acid and phosphoryl fluoride.

Example 2—Mixture of Components (A) and (E)

The electrolyte solution and the above-described mixture of components (A) were mixed at ambient temperature in a ratio of about 50:50 (v/v) and stored at this temperature for 7 days before NMR spectra were recorded at 298 K and 333 K.

The $^1$H-NMR showed not only the signals of the solvent mixture from example 1 but also the signals of the components (A).

The $^{31}$P-NMR showed no further signals relative to the spectrum from example 1. The weak signals at −19 and −34 ppm visible in example 1 were no longer detectable, presumably due to dilution with the component (A).

The $^{19}$F-NMR spectrum showed no further signals relative to the spectrum from example 1. The weak signals at −85 and −90 ppm visible in example 1 were no longer detectable, presumably due to dilution with the component (A).

Since no strengthening of the signals for difluorophosphoric acid and phosphoryl fluoride or appearance of new signals indicating phosphoric esters was observed in the NMR spectra it is apparent that at ambient temperature over a period of 7 days and NMR measurement at 298 K and 333 K no reaction between the component (A) and LiPF$_6$ has taken place. The disappearance of the signals for difluorophosphoric acid and phosphoryl fluoride previously observed in example 1 after mixing with component (A) in example 2 is attributable to the effect of dilution.

Examples 3 to 7—Mixture of Components (A) and (E) with Further Customary Constituents of Coolants The electrolyte solution and the above-described mixture of the components (A) were mixed in the volume ratio indicated in the table at ambient temperature (about 20° C.) and stored at this temperature for 7 days before $^{31}$P- and $^{19}$F-NMR spectra were recorded at 298 K and 333 K.

| Example | Electrolyte liquid (E) | Component (A) | Water | Monoethylene glycol | Diethylene glycol | Triethylene glycol | Glycerol |
|---|---|---|---|---|---|---|---|
| 1 | 100 | | | | | | |
| 2 | 50 | 50 | | | | | |
| 3 | 50 | 40 | 10 | | | | |
| 4 | 50 | 40 | | 10 | | | |
| 5 | 50 | 40 | | | 10 | | |
| 6 | 50 | 40 | | | | 10 | |
| 7 | 50 | 40 | | | | | 10 |

The observations in examples 3 to 7 corresponded to those of example 2; no strengthening of the signals for difluorophosphoric acid and phosphoryl fluoride or appearance of new signals indicating phosphoric esters was observed in the NMR spectra. It is thus apparent that at ambient temperature over a period of 7 days and NMR measurement at 298 K and 333 K no reaction between $LiPF_6$ and the component (A) or the additionally added constituents has taken place.

The invention claimed is:

1. A method of cooling a lithium-ion rechargeable battery, the method comprising:
   transferring heat through a heat-transfer liquid comprising a component (A) and a component (B),
   wherein component (A) comprises at least one alkylene glycol derivative of formula (I)

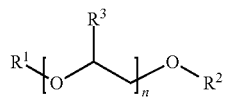

where
$R^1$ is hydrogen or $C_1$- to $C_4$-alkyl,
$R^2$ is $C_1$- to $C_4$-alkyl,
$R^3$ is hydrogen or methyl, and
n is on arithmetic average a number from 3.0 to 4.0; and
wherein component (B) comprises at least one corrosion inhibitor selected from the group consisting of
(Ba) an orthosilicate ester and/or an alkoxyalkylsilane,
(Bb) an azole derivative, and
(Bc) a compound of general formula (II)

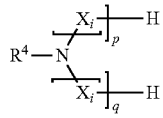

where
$R^4$ is an organic radical having 6 to 10 carbon atoms,
p and q are independently of one another a positive integer from 1 to 30, and
each $X_i$ for i=1 to p and 1 to q are independently of one another selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2$—O—; and
wherein the lithium-ion rechargeable battery comprises as an electrolyte (E) at least one compound selected from the group consisting of lithium hexafluorophosphate ($LiPF_6$), lithium tetrafluoroborate ($LiBF_4$), lithium perchlorate ($LiClO_4$), lithium phosphate ($Li_3PO_4$), and lithium bis(oxalato)borate (LiBOB), and
wherein the heat-transfer liquid comprises less than 1 wt % of water.

2. The method according to claim 1, wherein the electrolyte is $LiPF_6$.

3. The method according to claim 1, wherein the lithium-ion rechargeable battery is a lithium cobalt dioxide rechargeable battery, a lithium titanate rechargeable battery, a lithium manganese rechargeable battery, a lithium nickel cobalt aluminum rechargeable battery or a lithium iron phosphate rechargeable battery.

4. The method according to claim 1, wherein the electrolyte is dissolved in an aprotic organic solvent (Eb).

5. The method according to claim 4, wherein the aprotic organic solvent (Eb) is an open-chain or cyclic carbonate.

6. The method according to claim 4, wherein the aprotic organic solvent (Eb) is a compound of formula (VII)

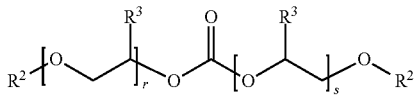

where
$R^2$ and $R^3$ are as defined above for the component (A) and r and s are on arithmetic average numbers from 3.0 to 4.0, wherein $R^2$ and $R^3$ may independently of one another for each r and s be identical or different.

7. The method according to claim 1, wherein the heat-transfer liquid has a kinematic viscosity at minus 40° ° C. according to ASTM D445 of not more than 600 mm$^2$/s.

8. The method according to claim 1, wherein the heat-transfer liquid has a specific heat capacity at 50° C. of at least 2.0 kJ/kg×K.

9. The method according to claim 1, wherein the heat-transfer liquid has a thermal conductivity of at least 0.15 W/m×K.

10. The method according to claim 1, wherein the at least one corrosion inhibitor comprises a compound of the general formula (II), and wherein the structural element $R^4$—N< of the general formula (II) is derived from at least one amine selected from the group consisting of n-hexylamine, 2-methylpentylamine, n-heptylamine, 2-heptylamine, iso-heptylamine, 1-methylhexylamine, n-octylamine, 2-ethylhexylamine, 2-aminooctane, 6-methyl-2-heptylamine, n-nonylamine, iso-nonylamine, n-decylamine, 2-propylheptylamine, and mixtures thereof.

11. The method according to claim 1, wherein the at least one corrosion inhibitor comprises an azole derivative, and
wherein the azole derivative is selected from the group consisting of benzimidazole, benzotriazole, tolyltriazole, and hydrogenated tolyltriazole.

12. The method according to claim 1, wherein the heat-transfer liquid comprises:
95 to 99.9 wt % of the component (A) and
0.1 to 5 wt % of the component (B).

13. The method according to claim 1, wherein the component (A) comprises more than one of the alkylene glycol derivative of formula (I), and
wherein a ratio of alkylene glycol derivatives of formula (I) where n=3 to those where n=4 is from 100:0 to 40:60.

14. The method according to claim 1, wherein the heat-transfer liquid consists of the component (A), the component (B), optionally at least one further corrosion inhibitor (C) distinct from the component (B), and optionally at least one further compound selected from the group consisting of a dye, a defoamer, and an antioxidant.

15. The method according to claim 1, wherein in the component (A), $R^1$ is hydrogen.

16. The method according to claim 1, wherein in the component (A), $R^2$ is methyl.

17. The method according to claim 1, wherein in the component (A), $R^3$ is hydrogen.

18. The method according to claim 1, wherein in the component (B), $R^4$ is a straight-chain alkyl or alkenyl radical having 8 carbon atoms.

19. The method according to claim 1, wherein in the component (B), p and q are independently of one another 1 or 2.

20. The method according to claim 1, wherein in the component (B), $X_i$ is —$CH_2$—$CH_2$—O—.

* * * * *